Dec. 10, 1968     C. L. ANDERSON     3,414,958
TURBINE VANE ASSEMBLY REPAIRING APPARATUS
Filed Aug. 19, 1966     4 Sheets-Sheet 1
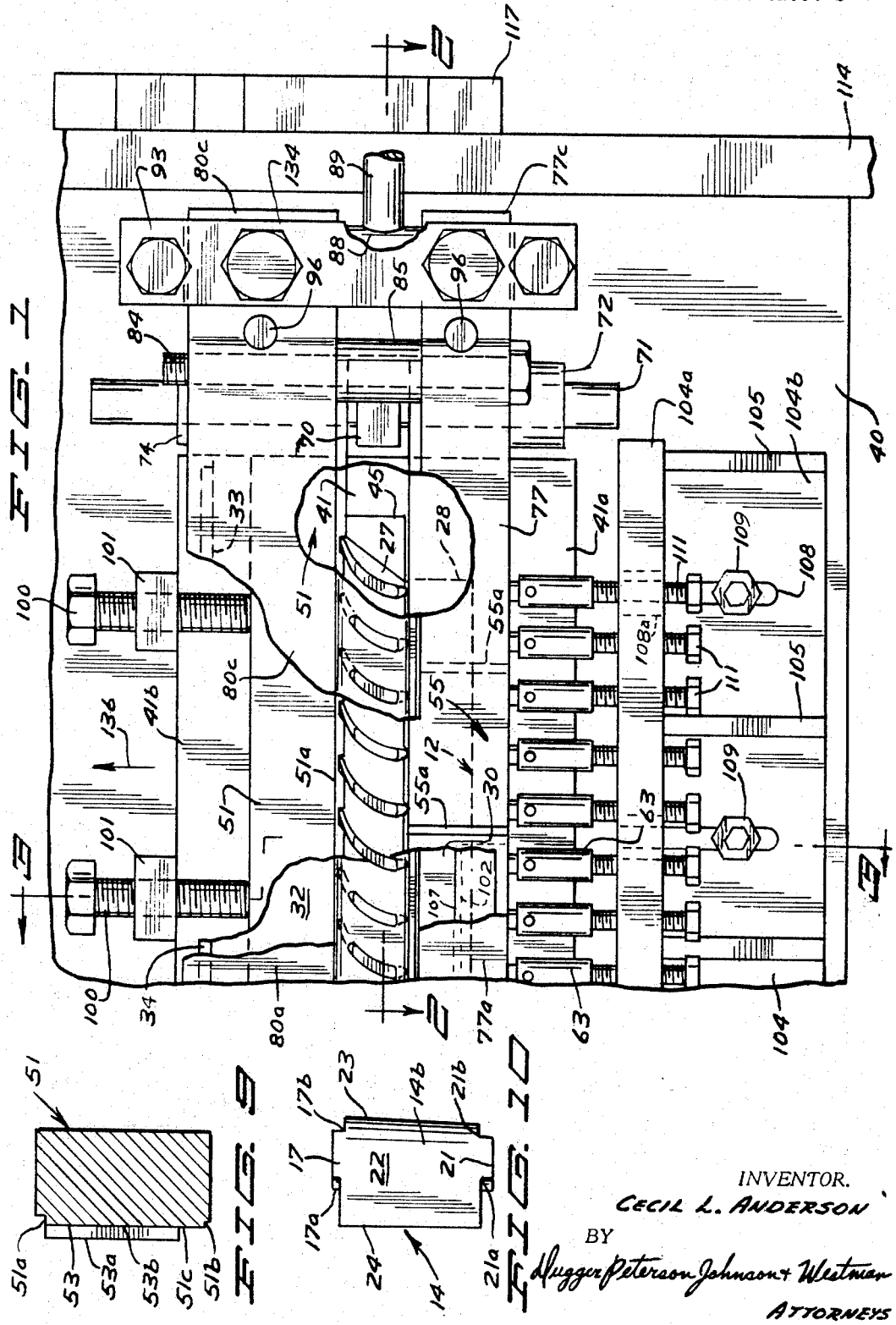
INVENTOR.
CECIL L. ANDERSON
BY
ATTORNEYS

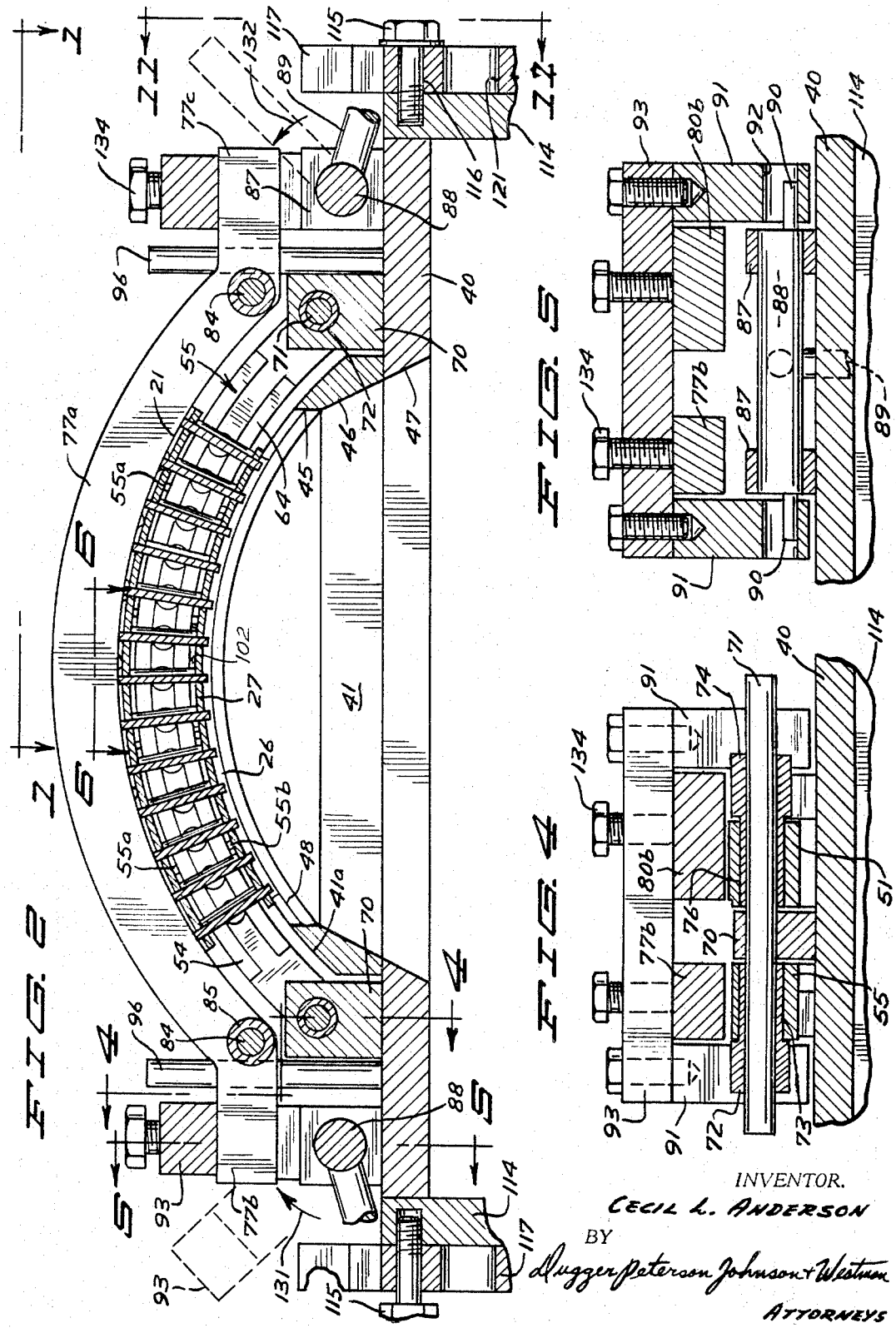

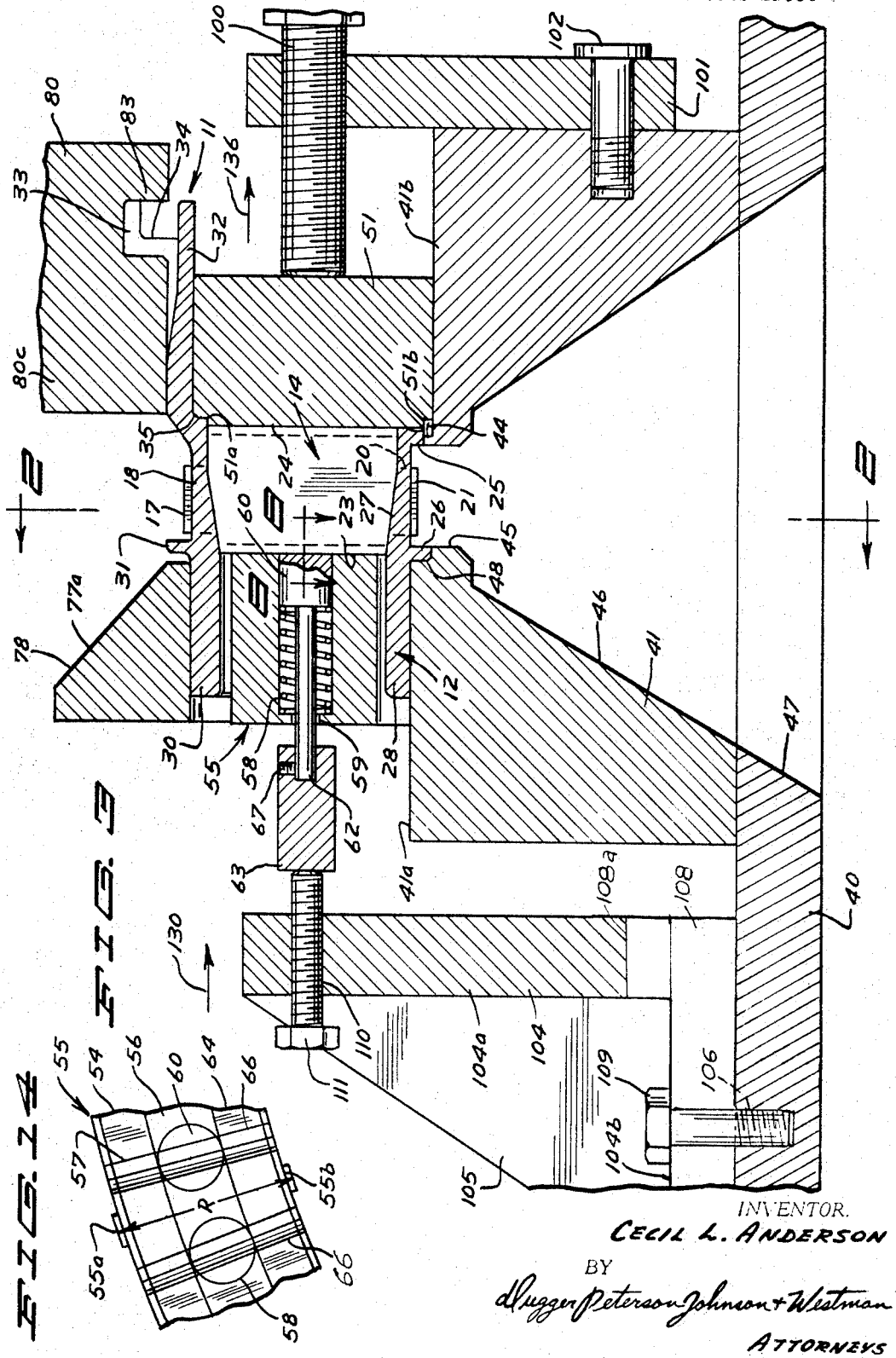

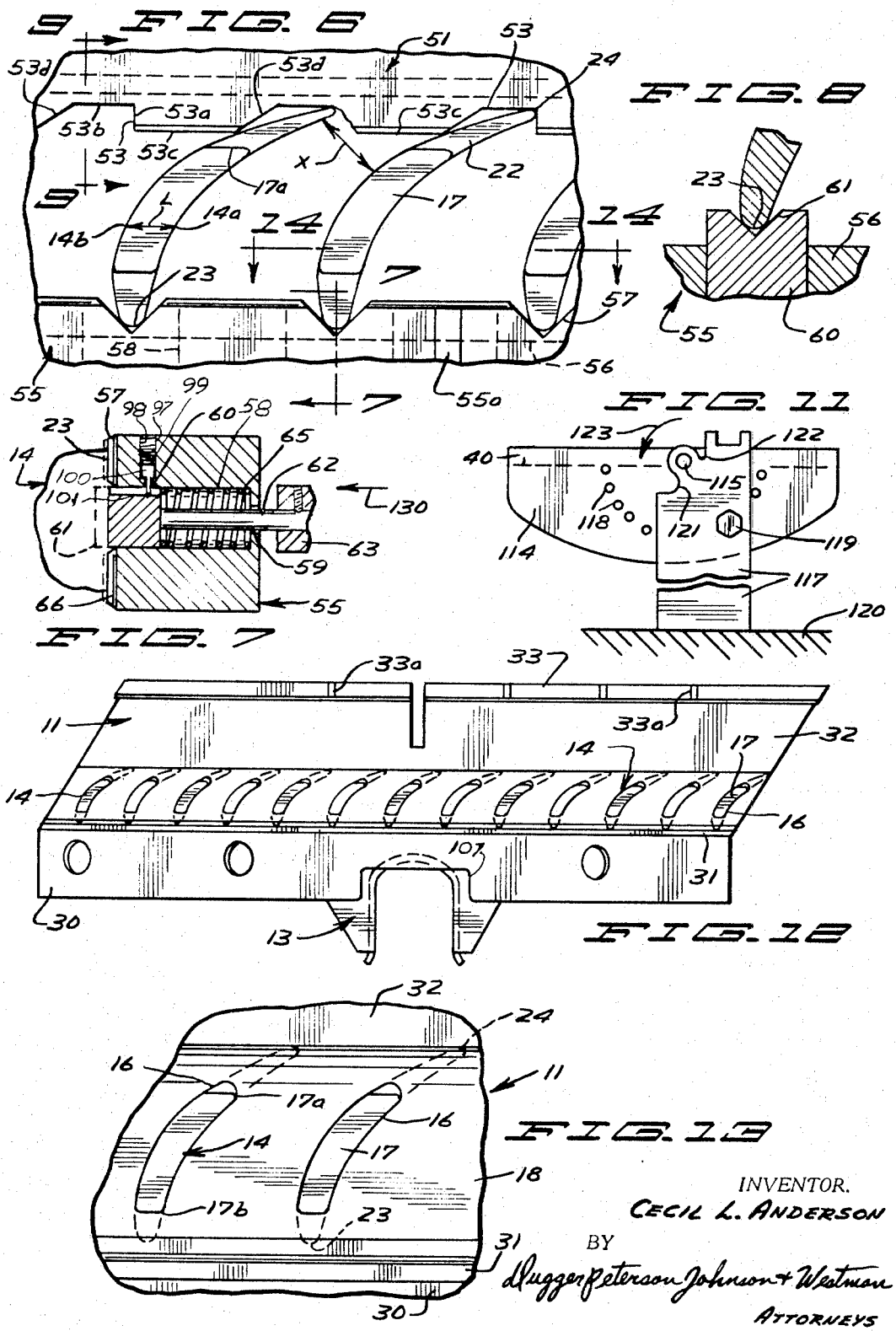

3,414,958
TURBINE VANE ASSEMBLY REPAIRING APPARATUS
Cecil L. Anderson, 8720 Griggs Ave.,
New Brighton, Minn. 55112
Filed Aug. 19, 1966, Ser. No. 573,605
23 Claims. (Cl. 29—200)

This invention relates to new and novel apparatus for retaining the vanes of a turbine vane assembly within close tolerances for repairing and reconditioning vane assemblies. More particularly this invention relates to new and novel apparatus for retaining vanes of a turbine vane assembly in the position that the trailing edges are located within close tolerances of a predetermined relationship while the vane assembly is being repaired including when the vanes are welded to the vane assembly bands.

In turbines, particularly turbine jet engines, the relative location, including the spacing of the trailing edge portions of the vanes of the first stage vane assembly are of critical importance in order to obtain the maximum power from the turbine. Further, for modern turbine engines that are able to withstand high temperatures and velocity of the exhaust gases that pass through the first stage, no satisfactory apparatus in the prior art has been made for retaining individual vanes in the sufficient close alignment with the necessary spacing therebetween in order that such vane assemblies may be satisfactorily repaired or reconditioned. Accordingly this invention has been made.

One of the objects of this invention is to provide new and novel apparatus for retaining the individual vanes of a vane assembly within sufficiently close tolerances so that the bands may be welded thereto with assurance that the vanes will be retained in proper relationship relative one another during the welding operation. Another object of this invention is to provide new and novel apparatus for abuttingly engaging trailing and leading edges of a plurality of vanes of a turbine vane assembly and at the same time providing access for welding the opposed surfaces of the outer and inner bands to said vanes. Still another object of this invention is to provide new and novel apparatus for abutting against the leading and trailing edges of a plurality of vanes for retaining said vanes in proper spaced relationship, and also to clampingly hold the radially inner and outer vane assembly bands in fixed positions relative to the vanes to facilitate welding vanes to the bands.

Other and further objects are those inherent in the invention herein illustrated, described, and claimed, and will become apparent as the description proceeds.

The invention is illustrated in the drawings in which the same numerals refer to the correspondings parts and in which:

FIGURE 1 is a fragmentary plan view of the apparatus of this invention showing the apparatus holding and retaining the outer and inner bands and vanes in position for welding the vanes to the bands with portions of the outer band and band clamp bars being broken away, said view being generally taken along the line and in the direction of the arrows 1—1 of FIGURE 2;

FIGURE 2 is a longitudinal cross sectional view generally taken along the lines and in the direction of arrows 2—2 of FIGURES 1 and 3;

FIGURE 3 is a transverse cross sectional view generally taken along the line and in the direction of arrows 3—3 of FIGURE 1;

FIGURE 4 is a transverse cross sectional view illustrating the structure for mounting the vane retaining jigs, said view being generally taken along the line and in the direction of the arrows 4—4 of FIGURE 2, and also illustrating the clamp mechanism for clampingly holding the clamp bars against the outer band;

FIGURE 5 is a transverse cross sectional view generally taken along the line and in the direction of arrows 5—5 of FIGURE 2 to more fully illustrate the construction of the mechanism for releasably clamping the clamp bars against the outer band;

FIGURE 6 is an enlarged, fragmentary plan view more clearly illustrating the construction of the portions of the jig that clampingly engage the vanes, and showing a plan view of the vanes, said view being generally taken along the line and in the direction of arrows 6—6 of FIGURE 2 other than the bands are not illustrated;

FIGURE 7 is a transverse cross sectional view of the vane leading edge jig, said view being generally taken along the line and in the direction of the arrows 7—7 of FIGURE 6 and showing a fragmentary portion of a vane abutting against a jig jaw;

FIGURE 8 is a fragmentary horizontal cross sectional view generally taken along the line and in the direction of the arrows 8—8 of FIGURE 3;

FIGURE 9 is a transverse cross sectional view of the vane trailing edge jig, said view being generally taken along the line and in the direction of the arrows 9—9 of FIGURE 6;

FIGURE 10 is an elevational view of one of the turbine vane assembly vanes;

FIGURE 11 is a fargmentary end view of the pivotal mounting structure of the apparatus of this invention, portions of said view being broken away;

FIGURE 12 is a plan view of a prior art turbine engine first stage vane assembly in a fully constructed condition;

FIGURE 13 is an enlarged fragmentary plan view of a portion of the structure illustrated in FIGURE 12; and FIGURE 14 is a fragmentary view of a portion of the vane leading edge jig, said view being generally taken along the line and in the direction of the arrows 14—14 of FIGURE 6 other than only the jig is illustrated.

Prior to describing the apparatus of this invention, a brief description of a conventional vane assembly will be set forth. For purposes of facilitating the description thereof, the various parts thereof will be referred to in their relative positions such as if assembled in a turbine engine.

Referring in particular to FIGURES 2, 3 and 12 (which shows a completely assembled vane assembly), and 13, the vane assembly includes an outer band 11, an inner band 12, a saddle 13, and a plurality of vanes 14, each being generally designated. For a conventional turbine jet engine, there are six complete vane assemblies that comprise the first stage. The inner band has a smaller radius of curvature than the outer band while the arcuate dimension of each of the bands is substantially more elongated than the axial width of the band. An axially intermediate portion of the outer band has a plurality of circumferentially spaced, transversely arcuately curved slots 16 through which the one ear portion 17 of the vanes extend. Ears 17 are welded to the exterior arcuate surface of band 11, i.e. to an axially intermediate portion 18 through which the slots extend.

The inner band 12 has a corresponding number of slots 20 in the axial portion 27, there being one slot 20 radially inwardly of each of the slots 16 through which the ear portion 21 of the respective vane is extended. The ears 21 are welded to the inner arcuate surface of portion 27. Each vane has a main body portion 22 with ear 17 integrally joined to the radially outer end thereof and an ear 21 integrally joined to the opposite end thereof. Further, the ears are located transversely intermediate the leading edge 23 and trailing edge 24 of the main body portion whereby ear 17 at its juncture with the main body portion forms shoulders 17a and 17b respectively (see FIGURE 10 and ear 21 at its juncture with the main body portions forms shoulders 21a and 21b respectively. The shoulders 17a, 17b abut against the inner arcuate surface of band 11 while shoulders 21a, 21b abut against the outer arcuate surface of band 12 to maintain the minimum radial spacing between said bands. Further the leading and trailing edges of each band converge slightly in a direction toward ear 21.

Referring to FIGURES 6 and 10, each vane has a generally concaved surface 14a that in a transverse direction from the leading edge toward the trailing edge has a first surface portion that is curved through a first series of radii of curvature and then is progressively curved through a series of radii of curvature that are of greater lengths than the first series. The vane also has an opposite surface 14b, the maximum longitudinal thickness of the vane, dimension L, being about ⅓ of the transverse distance from edge 23 to edge 24.

Band 12 has a radially inwardly extending flange 25 at one transverse edge portion thereof and is integrally joined to portion 27, the free edge of flange 25 being substantially coextensive with the trailing edges of the vanes. Band 12 also has a second radially inwardly extending flange 26 located axially opposite ears 21 from flange 25 and integrally joined to portion 27. The inner band also includes an axially elongated end portion 28 that has generally parallel inner and outer arcuate surfaces, a terminal edge and one edge integrally joined to the remainder of the band adjacent flange 26. In an assembled condition, inner band end portion 28 is a substantial distance radially inwardly of the corresponding end portion 30 of the outer band. Transversely intermediate outer band portions 18 and 30 there is provided an integrally formed radially outwardly extending flange 31; while to the opposite edge of portion 18 there is integrally joined a rim portion 32. Rim portion 32 and central portion 18 are joined together to form a shoulder 35 along the inner radial surface of band 12. The outer band also includes a right angle portion 33 that is joined to rim portion 32 to form a groove 34 that opens axially opposite the direction toward flange 31. Portion 33 has a plurality of transverse slots 33a.

The adjacent circumferential surfaces of end portions 28, 30 are joined by a saddle 13. The saddle is located generally longitudinal centrally relative the opposite axial edges of said portions such as illustrated in FIGURE 12.

Referring now in particular to FIGURES 1 and 3, the apparatus of this invention includes a base plate 40 which for purposes of facilitating the description of this invention will be considered in a horizontal condition until otherwise indicated. A lower band support member 41 is secured to plate 40 to extend thereabove and has an upper arcuate surface 41a of substantially the same radius of curvature as the inner surface of inner band end portion 28 except for the cutout 48 which is of a size and shape to form a close matching fit with flange 26 other than for the flange edge adjacent flange 25. As may be noted from FIGURES 1 and 2, the arcuate length of surface 41a is substantially greater than the arcuate length of end portion 28 and intermediate portion 27. Support member 41 also includes a second arcuate surface 41b having a slightly smaller radius of curvature than surface 41a and of nearly the same arcuate length. A transversely narrow, radially outwardly extending offset 44 is joined to surface portion 41b, support member 41 having a cutout 45 of an axial dimension about the same as the corresponding axial distance between adjacent surfaces of flanges 25, 26 and of arcuate length greater than the arcuate length of the inner band. As may be noted from FIGURE 3, the cutout 45 opens through the upper surface of the support member between offset 44 and groove 48 and to groove 48 through the upper surface of the support member and also opens to a cutout 46 in said support member which in turn opens to a cutout 47 in the base plate. As may be noted from FIGURE 3, the cutouts 46, 47 in transverse cross section and in longitudinal cross section are progressively increasing dimension in the direction away from surfaces 41a, 41b.

Removably seatable on surface portion 41b is a vane trailing edge jig 51, said jig having an inner arcuate surface of substantially the same curvature as surface portion 41b and of a substantially greater arcuate length. Jig 51 also has a radially outer arcuate surface of a radius curvature to form a matched fit with the radial inner surface of the outer band rim portion 32, the jig being provided with an arcuate groove 51a into which the outer band central portion 18 extends such as illustrated in FIGURE 3. Radially opposite groove 51a, the jig is provided with a groove 51b that is of a slightly greater radial dimension than the corresponding dimension of offset 44. Further, jig 51 has a plurality of radially elongated grooves 53 extending between grooves 51a, 51b, the shape and function of which will be described hereinafter. However it is presently noted that the transverse depth of grooves 53 is greater adjacent groove 51a than it is adjacent groove 51b.

There is provided a second jig, generally designated 55, having a generally arcuate outer surface of a radius of curvature that is less than the radius of curvature of the inner surface of end portion 30 by the radial thickness of the integrally joined, transversely extending outer lands 55a (also see FIGURE 14). The vane leading edge jig 55 likewise has a generally arcuate inner surface that is of a radius of curvature that is substantially the same as the radius of curvature of the radially outward surface of end portion 28 plus the radial thickness of the integrally joined lands 55b. To be noted is that lands 55a and lands 55b are respectively circumferentially spaced from one another. Thus the maximum radial thickness R of the jig 55 is the radial dimension from the outer surface of land 55a to the inner surface of land 55b, this dimension being slightly less than the radial dimension between the adjacent surfaces of outer and inner band end portions 30, 28. One side of the jig 55, intermediate the arcuate surfaces, has an arcuately elongated, axially extending flange 54 (see FIGURE 14), flange 54 having an arcuate surface coextensive with the outer generally arcuate surface of the jig; a second arcuately elongated, axially extending flange 64 having a surface coextensive with the inner arcuate of the jig; and a recessed, arcuately elongated, planar surface 56 extending radially between flanges 54, 64. Flanges 54, 64 are of the same axial thickness. Flange 54 has a plurality of arcuately spaced, radially extending notches 57 that are generally V-shaped in horizontal cross section while flange 64 has a corresponding number similarly shaped notches 66, each notch 57 being aligned with a notch 66 but spaced therefrom by the radial dimension of surface 56.

The arcuate spacing between the apexes of adjacent notches 57, 57 and 66, 66 respectively is the same as the arcuate spacing between the trailing edges of adjacent vanes in the vane assembly assembled condition, the spacing being progressively less in a radially inward direction. Further, the axial depth of each of the notches 66 is substantially the same as that of the notches 57; but the axial depth of notches 57, 66 is substantially less than the dimension between the leading edge 23 of a vane and the most closely adjacent surface of ears 17, 21 (see FIGURE 6).

For each set of notches 57, 64 the jig 55 has a transversely elongated bore 58 that opens through surface 56, the diameter of which is substantially greater than the maximum arcuate dimension of the corresponding notch 57. Further the central axis of each bore 58 is located in the radial plane of the apex edges of a set of notches 57, 66 and is parallel to the generally arcuate surfaces of the jig 55. Thus each bore 58 opens between a set of notches 57, 66, the opposite end portion of bore 58 opening to a reduced diameter bore 59 that in turn opens to the jig surface opposite surface 56.

Slidably extended within bore 58 is a cylindrical jaw 60 of a slightly smaller diameter than the bore 58, jaw 60 being provided with a generally V-shaped notch 61 that is of substantially the same angle of divergence as a notch 57 and is of the same axial depth. Further the axial length of jaw 60 is substantially less than the axial length of bore 58 whereby with the jaw in a retracted axial position in the bore, the notch 61 generally forms a continuation of notch 57.

A rod 62 has one end fixedly secured to the end portion of jaw 60 opposite notch 61, extends through bore 58 and bore 59 to have an opposite end portion secured in an enlarged diametric cylindrical block 63 by a set screw 67 (see FIGURE 3) that extends into a detent provided in the rod. Rod 62 is of sufficient length that when block 63 abuts against one surface of jig 55, jaw 61 is located a substantial distance axially outwardly from surface 56 while a portion of jaw 60 is still located within bore 58. Within bore 58 and surrounding the rod 62 there is a coil spring 65 that has one end abutting against jaw 60 and an opposite end abutting against the shoulder formed by bores 58, 59 to resiliently urge the jaw to the FIGURE 7 position (or further in the direction of arrow 130) wherein the notch 61 is located axially outwardly of the adjacent set of notches 57, 66 such as illustrated in said figure.

In order to prevent the jaws from rotating, each jaw is provided with an axially extending groove 101, the reduced diameter portion of a guide pin 100 extending in said groove. Each guide pin is mounted in a radially extending bore 97 in jig 55, each bore having a reduced diameter portion that receives the reduced diameter portion of pin 100, and opening to bore 58. Thus the shoulder of bore 97 limits the movement of the pin in a radially inward direction in the event the jaw has been removed from bore 58. A coil spring 99 in bore 97 has one end bearing against pin 100 to resiliently urge the pin toward the jaw and an opposite end bearing against a set screw 98 that is threaded into bore 97. Accordingly the jaws can slide axially in bores 58 but cannot rotate due to the guide pins extending into grooves 101.

In order to removably mount the jigs 51, 55 and retain them in alignment with their notches 57, 66 and 53 properly offset such as will be described hereinafter, there is provided a pair of mounting blocks 70 (see FIGURES 1, 2 and 4). Each mounting block is secured to the base plate 40 to extend thereabove, is of a transverse dimension less than the transverse dimension of the cutout 45 and is transversely centered with reference to the cutout at longitudinally opposite ends of the lower band support 41. Each mounting block has a transversely extending aperture in which a transversely elongated pin 71 is press fitted to extend transversely outwardly of either side thereof. Each pin 71 mounts a bushing 72 that has an end portion extended through an aperture 73 provided in the respective arcuate end portion of jig 55 and has an enlarged diametric portion adjacent a vertical surface of jig 55 to provide a bearing surface. On the opposite end portion of each pin there is provided a bushing 74 that has an end portion extended through an aperture 76 in jig 51 and an enlarged diametric portion adjacent jig 51 as shown in FIGURE 4. As a result of the provision of members 70–72 and 74, when the jigs are mounted on said members, the jigs cannot be longitudinally moved relative one another but only can be translated in transverse direction relative to one another. Further blocks 70 are located transversely between said jigs and are of a transverse width so not to preclude the jigs being moved closely adjacent one another that the trailing and leading edges of the vanes will abut against the respective notch portions 57, 66 and 53 as will be set forth hereinafter.

Referring now in particular to FIGURES 2–4, there is provided a hold-down or clamp bar 77 that has a central arcuate portion 77a of a constant inner radius of curvature of substantially the same radius as the outer surface of end portion 30 of band 11 and a substantially greater arcuate length than said portion 30, one longitudinal end of central portion 77a being integrally joined to end portion 77b that extends horizontally outwardly therefrom. The opposite longitudinal end of central portion 77a is integrally joined to a horizontally extending end portion 77c. End portions 77c, 77b are rectangular in transverse cross section, while the central portion 77a has an incline surface 78 of a greater arcuate length than the outer band and slopes transversely inwardly and downwardly toward flange 31 when the hold-down bar is bearing against the outer band such as illustrated in FIGURE 3. Further as may be noted from FIGURE 3, hold-down bar 77 is of a smaller transverse width than jig 55, the hold-down bar being mounted by structure to be described hereinafter and having one edge extending generally parallel and transversely spaced from flange 31, and an opposite edge extending parallel to the first mentioned edge and to the corresponding edge of the jig 55.

There is provided a second hold-down bar 80 having a central portion 80a of substantially the same arcuate length as central portion 77a but of a substantially greater radial thickness than portion 77a. Portion 80a has an inner surface of a radius of curvature slightly greater than the radius of curvature of the outer surface of the rim 32, the transverse width of the central portion being such that one vertical surface is located generally vertically above shoulder 31 and the opposite vertical surface is located substantially transversely outwardly of said rim. Transversely intermediate the last two mentioned surfaces of hold-down bar 80, the hold-down bar is provided with an arcuately elongated groove 83 for receiving the angular flange 33 and bearing thereagainst. Thus as may be noted from FIGURE 3, the transverse width of the hold-down bar 80 is substantially greater than the corresponding transverse width of jig 51. In order to retain the hold-down bars 77, 80 in the proper transverse spaced relationship, they are bolted together by bolts 84, there being prvoided spaces 85 on the bolts and having opposite ends abutting against the respective hold-down bar (see FIGURE 2). The bolts 84 are located generally above the mounting blocks 70 when the apparatus of this invention is in a condition for welding the vanes to the vane bands.

Hold-down bar 80 has a generally horizontally extending end portion 80c joined to one end of portion 80a and a horizontally extending end portion 80b joined to the opposite end of portion 80a. When bars 77, 80 are bolted together, the upper surfaces of end portions 77c, 71b, 80c and 80b are located in a common horizontal plane, the vertical thickness of portion 80a being substantially greater than the corresponding dimension of end portions 80b and 80c.

In order to clampingly retain the hold-down bars against the outer bands in a manner to be more fully described hereinafter, there is provided that at each longitudinal end of the base plate, a clamping device that includes a pair of transversely spaced mounting blocks 87 that are longitudinally opposite the adjacent block 70 from the lower band support 41 (see FIGURES 2 and 5). Pivotally mounted by each pair of blocks 87 is a pivot member 88 that has one end of a longitudinally elongated handle 89 fixedly attached thereto intermediate blocks 87. At each end of the pivot member and extending transversely outwardly from the adjacent block 87 is an eccentrically located pin 90 that is attached to member 88 to pivot therewith. For each pin 90 there is provided an elongated bar 91 that at one end has a cylindrical shaped aperture 92 into which the adjacent pin 91 is projected. A transverse cross bar 93 at each end is attached to the adjacent opposite end of bar 91. Members 88 and 90–93 are of a size and shape that upon pivoting the handles 89 about the axes of pivot members 88 in the appropriate direction, the cross bars 93 may be moved between a position clear of the adjacent end portions of the hold-down bars, and a position bearing against the top surfaces of the adjacent end portions of the hold-down bars such as illustrated in FIGURES 2 and 5 whereby a clamping force is exerted against the hold-down bars to clampingly retain the outer band in given position. Thus cross bars 93 are selectively movable between a position abutting against the outer surfaces of the end portions 77b, 80b and 77c, 80c respectively in overlying relationship thereto and a position substantially more remote from said end portions than the central portions 77a, 80a of said hold-down bars.

In order to facilitate proper alignment of the hold-down bars relative the lower band support, a guide pin 96 is extended through a guide pin aperture in each end portion of each hold-down bar and has its lower end attached to the base plate to extend perpendicular relative thereto. Thus the hold-down bars cannot be moved longitudinally or transversely, but can be translated vertically relative to the pin 96 and the base plate (in a horizontal condition) as long as the guide pins extend within the guide pin apertures.

An arcuate plate 102 (see FIGURE 1) is secured to surface portion 41a in a position that said plate extends through the notch of inner band portion 28, the notch corresponding to notch 107 of the outer band. Plate 102 is of a smaller arcuate length than the inner band notch and of a radial thickness to bear against the generally inner arcuate surface of jig 55 longitudinally intermediate adjacent lands 55b when the jig and inner band are positioned such as illustrated in FIGURE 1–3. Thus plate 102 is of a radial thickness substantially the same as the combined radial thickness of portion 28 and a land 55b. Plate 102 is extending through the inner band notch provides support to jig 55 to prevent buckling or bending of the jig when the hold-down bar exerts a clamping force through the outer band to said jig and thence through the inner band to member 40.

Referring to FIGURES 1 and 3, during use the apparatus of this invention, the jig 51 is seated on surface 41b of the bottom band support member and is transversely movable relative thereto. The transverse width of the jig 51 is substantially smaller than the transverse width of surface 41b. In order to selectively retain the jig 51 against transverse movement in a direction away from the cutout 45 but at the same time permitting limited adjustment of the jig in a transverse direction, there is provided three adjusting bolts 100. Each bolt 100 is threaded through one end portion of an elongated bar 101 and has an end portion abuttable against the surface of jig 51 opposite notches 53. Each bar 101 at its opposite end is pivotally mounted on a transverse pivot pin 102 that is secured to the lower band support member a substantial distance below surface 41b. As may be noted from FIGURES 1 and 3, when the base plate is in a horizontal condition and a bar 101 is in position that its screw 100 bears against jig 51, a substantial length of the lower end portion of the bar bears against a vertical surface of the lower band support member and thus when the adjustment screws are sufficiently tightened to exert a force through jig 51, the vanes and jig 55 through screw 111, bar 101 does not pivot about its pin 102. However upon loosening the adjustment screw sufficiently, the bar 101 can be pivoted downwardly below the surface 41b for purposes to be described. It should be noted that only two of the adjustment screws and bars 101 are illustrated in FIGURE 1, there being a third adjustment screw and bar 101 located for bearing against the left end portion of jig 51 as viewed in FIGURE 1 but not shown in said FIGURE. In the upright positions of bars 101, the screws bear against the jig 51 radially intermediate its inner and outer arcuate surfaces.

Located transversely opposite the lower band support member 41 from bars 101, there is a bracket 104 having a leg 104a extending parallel to the base plate and abutting therewith and a leg 104b extending perpendicular to the leg 104a. A plurality of reinforcing gussets 105 have edges secured to legs 104a, 104b. The plate 40 is provided with a plurality of apertures 106 into each of which a bolt 109 is threaded, each bolt 109 also extending through a transversely elongated slot 108 in the bracket 104. The slots 108 open through leg 104a, slots 108 being enlarged at 108a so that the bracket may be moved so that slotted portions 108a permit the bolt heads relatively moving therethrough whereby the bracket may be removed without removing bolts 109. Accordingly, by loosening the bolts, the brackets 104 may be adjustably positioned a limited amount in transverse direction relative the base plate and then retained in adjusted position by tightening the bolts; or with the bolts loosened, slide in a direction opposite arrow 13 sufficiently to be removed from the base plate without removing the bolts from the base plate.

When the jig 55 is properly seated on the outer surface of end portion 28 of the lower band, and the opposite surface of end portion 28 is seating on the surface 41a of the lower band support member 41 such as illustrated in FIGURE 3, the bracket leg 104 has a threaded aperture 110 axially opposite each aperture 59 of the jig 55. Into each aperture 110 there is threaded an adjustment bolt 111 that has an end portion to bear against the adjacent surface of the axially adjacent cylindrical block 63. As a result, by threading the bolt 111 into the aperture 110, it will force the axially adjacent cylindrical block 63 in a transverse direction toward the jig 55.

To each longitudinal edge of the base plate 40 there is fixedly attached a transverse plate 114 that extends generally perpendicular to the plate in the direction opposite the extension of the support member 41 (see FIGURES 1, 2 and 11). Each plate 114 mounts a longitudinally extending pivot bolt 115 that is pivotally extended through the upper end portion of a support bracket 117, the lower end of the support bracket being fixedly attached to suitable structure such as table 120. As a result, the support plate and the structure mounted thereon may be pivoted about longitudinal axes of pivot bolts 115. Plate 114 is also provided with a plurality of apertures 118, said apertures being spaced along an arc having a radius of curvature extending through the pivot axes of pins 115. A locking pin 119 is extended through an appropriate aperture in the support bracket 117 and into the adjacent aperture 118 for releasably retaining the plate 114 in an adjusted angular position relative the bracket 117.

As may be noted from FIGURE 11, the upper portion of support bracket 117 is provided with the notch 122, notch 122 being provided to have the adjacent handle 89 extended thereinto when plate 40 is in horizontal condition such as illustrated in FIGURE 11. The support bracket 117 is also provided with second notch 121 that opens in a direction angularly remote from the opening of notch 122 for receiving the handle 89 when the base plate 40 and the structure mounted thereon has been pivoted in direction of arrow 123 about the pivot bolts 115 to aid in retaining the handle in a hold down bar clamped condition when the base plate has been pivoted to a position to facilitate access to the cutouts 45–47.

The apparatus of this invention has been described, the use thereof will now be set forth. However, first it is to be mentioned that the location of the trailing edges 24 of the vanes relative one another is critical in order to obtain maximum power output of the turbine in which the vane assembly is used. Further, the dimension between the surfaces adjacent vanes indicated by X in FIGURE 6 is also critical because this is a critical area through which exhaust gases go. After usage of the vane assemblies, cracks develop in the vanes, the edge portions become warped and the area in part designated by dimension X deviates from that required for obtaining optimum power requirement. Further, since the vane assemblies are quite expensive, for example in one conventional turbine jet engine, there are six vane assemblies required, and each vane assembly when purchased new requires costs over $600.00, it is desirable to utilize the vane assemblies or as many of the parts thereof for as long a period as possible. Accordingly, upon inspecting a vane assembly, if the trailing edge portions of the vanes cannot be brought into proper spacing relative one another, or adjacent vanes bent to again form the critical area X, or one or more vanes need replacing, or for other reasons, it has been found that it is easier to disassemble the vane assembly and rework the vane assembly. In disassembling the vane assembly, the saddle is cut from the bands and the welding of the tab portions to the upper and lower bands is removed (for example by a cutting torch). Thereupon the outer and inner bands may be separated from the vane, it sometimes being necessary to enlarge the slots in the bands in order to remove the vanes from the bands. Now the vanes are again inspected and where possible straightened and repaired, and if not repairable then new vanes are substituted for the non repairable ones.

Thence with the clamping device in the nonclamped position such as illustrated in dotted lines in FIGURE 2 for the left clamping device, the hold-down bars being removed, the adjustment screws 111 loosens sufficiently so that the jig 55 is movable to the left from that illustrated in FIGURE 3, and the bars 101 pivoted to extend generally parallel relative the base plate 40, or at least with bars 101 extending at an elevation completely below surface 41b, and jig 51 removed from the support member, the lower band 12 is positioned on support member such that flange 26 forms a matching fit in groove 48 and flange 25 rides on offset 44. Sometimes, due to shrinkage, flange 25 is further to the left of offset 44 than illustrated in FIGURE 3, jig 51 being provided with the groove 51b of a size and shape that the offset 44 may be extended thereinto while the inner arcuate surface of the jig bears against surface 41b. That is end portion 28 of the band is translated so that it extends between jig 55 and surface 41b and is longitudinally positioned such that the trailing edges of the slots in the lower band are substantially transversely opposite the notches 55, 66. Now jig 51 is moved with bushing 74 to a position to have its arcuately elongated, vertical surface 51c abut against the edge of the lower band such as illustrated in FIGURE 3, surface 51c being radially intermediate groove 51b and notches 53 (see FIGURE 9). At this time the notches 53 are properly longitudinally offset from notches 57, 66 such as illustrated in FIGURE 6 although the transverse spacing between jigs 51 and 55 is somewhat greater than that illustrated in FIGURE 6 in order to facilitate the relative easy placement of the vanes between the jigs to extend into the notches of the jigs.

With the adjustment bolts 100, 111 loosened somewhat, the inspected vanes have their ears 21 inserted into the lower band slots with the trailing edge of each vane extended into a notch 53 and the leading edge extended into the set of notches 57, 66 longitudinally to the left of the aforementioned notch 23 as viewed in FIGURE 6. In thus positioning, the vanes, by grasping blocks 63, jaws 60 can be moved to the left as viewed in FIGURE 3 to facilitate positioning the vanes, and upon releasing block 63, the spring 60 will move the jaws to resiliently hold the vane against jig 51. In the event a vane cannot be properly aligned with reference to the aforementioned notches due to the shape of the lower band slot in which it is to be inserted, the appropriate portion of the slot is enlarged and the vane is inserted into the enlarged slot. Now the adjustment bolts 100 are tightened to transversely move the surface 51c of jig 51 tightly against the adjacent edge of the lower band. Thereafter, the adjustment bolts 111 are tightened to move in the direction of arrow 130 (see FIGURE 3) whereby cylindrical blocks 60 and rods 59 force jaws 60 in the same direction. The reason for this is that for optimum results, the trailing edges of the vanes 44 should all lie in a common plane, while due to shrinkage or wear, the arcuate width of all the vanes is not the same. Accordingly through the provision of the jaws 60 and adjustment bolts 111 such difference in arcuate dimensions can be compensated for.

It is to be noted that when the vanes are properly aligned, each vane will extend into notch 53 such that the trailing edge thereof abuts against the generally transverse surface 53a, an arcuate surface terminating in the trailing edge abuts against surface 53b adjacent its intersection with surface 53a, and another adjacent arcuate portion of the vane abuts against the notch at the intersection of inclined surface 53d with a surface 53c. Surface 53b is recessed transversely relative the generally planar surface 53c, while longitudinally opposite surface 53a, the notch has the inclined surface 53d that at one edge intersects surface 53b and at the opposite edge intersects surface 53c. Thus when the vanes are properly aligned, an arcuate surface portion of the vane abuts against jig 51 at the intersection of surfaces 53c and 53d such as illustrated in FIGURE 6.

With the jigs 51, 55 bearing against the trailing and leading edges of the vanes (or jaws 60) and bolts 100, 111 tightened, the outer band is positioned over the jigs such that shoulder 31 abuts against jig groove 51a and the ears 17 extend up into the outer band slots. In the event that it is necessary, appropriate portions of the outer band slots are enlarged so that the outer band may be slipped down over the ears 17 to have the outer band central portion bear against the main body portions 22 of the vanes.

Next the hold-down bars 77, 80 are moved downwardly to have the pins 96 extend upwardly through the guide pin apertures and thence moved into abutting relationship with the outer band such as illustrated in FIGURE 3. Then the clamping device (left side as viewed in FIGURE 2) is pivoted in direction of arrow 131 relative pivot member 88 until the bar 93 abuts against the upper surfaces of the hold-down bar portions 77b, 80b while the other clamping device is pivoted in direction of arrow 132 until the hold-down bar 93 bears against the upper surfaces of end portions 77c, 80c. Thereupon the left hand handle 89 as viewed in FIGURE 2 is pivoted in the direction opposite the arrow 131 and the right hand handle in the opposite direction of arrow 132 for moving the eccentrics 90 and thereby bars 91 to tightly draw the hold-down bars into clamping engagement with the hold-down bar end portions. In the event that it is necessary, the bolts 134 can be threaded such that the hold-down bars are held in tight clamping engagement against the outer surface of the outer band. Thereafter the ears 17 are welded to the exterior surface of the outer bands in an area intermediate flange 31 and the juncture of rim 32 with the central section of the outer band, the slots being filled during welding.

Since, at the time the ears are being welded to the band all of the notches 53 are of the same size and shape and all surfaces 53b lie in one common plane and all surfaces 53c lie in another common plane; all the notches 57, 66 and jaw notches are of the same size and shape with the apex edges of notches 57, 66 lying in a common plane; and each notch 53 is longitudinally offset from a set of a jaw notch, and notches 57, 66 for abuttingly engaging a single vane, the jigs will retain the vanes with the vane trailing edges in a common plane. For the vanes illustrated, each trailing edge is divergingly inclined in a radially inward relative the leading edge. That is, in the FIGURE 3 position, edges 24 extend vertically while edges 23 extend upwardly and transversely outwardly relative edges 24 (the transverse width of the vanes being greater adjacent ears 17 than ears 21—see FIGURE 10). Accordingly the plane of surfaces 53b are correspondingly inclined relative the common plane of the apex edges of notches 57, 66 whereby in the FIGURE 3 position, the radially inner portions of surfaces 53b are more axially adjacent jig 55 than the radially outer portions of said surfaces.

In order to facilitate welding the ears 21 to the inner band, the lock pins 119 are removed and the plate 40 and brackets 114 are pivoted about pivot bolts 115 in the direction of the arrow 123 through an angle of at least 90°. Then the pivot bolts 119 are extended through the brackets 117 into the longitudinally adjacent slots 118 to retain plate 40 in the desired angular position. Now due to the provision of the cutouts 45, 46, 47, ears 21 are accessible and are welded to the interior surface of the inner band.

After all the vanes have been welded to the inner bands, now the locking pins 119 are removed, base plate 40 is pivoted in the direction opposite arrow 123 to the position illustrated in FIGURE 11 and the locking pins are reinserted to retain the base plate in said position. Thereafter the clamp handles 89 are respectively pivoted in directions of arrows 131, 132, the right handle of FIGURE 2 being moved to the dotted line position whereupon the adjacent bar 93 is loosely resting on the hold-down bar end portions 77c, 80c. Thence the right bar 93 of FIGURE 2 is pivoted in the direction opposite arrow 132 and the left bar in the direction opposite arrow 131 to positions off the hold-down bar end positions, than the handles and bars 93 further pivoted in the same directions as last indicated for the bars 93; and thereafter the hold-down bars 77, 80 are translated upwardly off the guide pins. Also the adjustment bolts 100 are loosened and thereafter the bars 101 are pivoted to a position to be located intermediate the surface of base plate 40 and surface 41b. Thence jig 51 is translated in the direction of arrows 136 (see FIGURES 1 and 3); and likewise the inner and outer bands with the vanes welded thereto are translated in the same direction sufficiently that the end portion 28 is no longer between jig 51 and surface 41a, and then moved to a location for further operations. Now either the old saddle 13 (if it is in good condition) or new saddle 13 is welded to the band end portions 28, 30. Now the vane assembly is in reassembled condition.

What I claim is:

1. Apparatus for repairing or reconditioning a vane assembly having an arcuately elongated outer band, an arcuately elongated inner band, each band having a radially inner surface; a radially outer surface and a corresponding number of arcuately curved vane receiving slots primarily extending in a direction transverse to the direction of elongation of the bands and opening through the inner band outer surface, and the outer band inner surface through to the outer band outer surface, each band having axially opposed edges transversely spaced from said slots, and a plurality of vanes each having an ear extendable in an inner band slot and an outer band slot and attachable to the adjacent band, said vanes in their attached condition to the bands having a trailing edge and a leading edge transversely opposite the trailing edge and offset from the trailing edge in a direction of elongation of the bands, said apparatus comprising a longitudinally elongated base member, a longitudinally elongated inner band support member having surface portions of a curvature for abuttingly engaging a substantial portion of the inner band inner surface, first jig means cooperating with the bands for at least in part retaining the outer band in a given radial spaced relationship to the support member and receiving the vane trailing edge portions while in part retaining the vanes in a preselected longitudinal spaced relationship with the vane trailing edges in substantially the same plane, second jig means for in part retaining the bands in a preselected radial spaced relationship and receivingly retaining the vane leading edge portions in the same longitudinal spaced relationship that the first jig means retains the trailing edge portions and longitudinally offset therefrom, means mounting the jig means to retain the first and second jig means in a given longitudinal relationship, while permitting a change of the transverse spacing between the jig means, adjustment means for selectively retaining the first jig means against transverse movement in a transverse direction away from the second jig means, second adjustment means cooperating with second jig means for selectively retaining the vanes against transverse movement in a transverse direction away from the first jig means, and means mounted on the base member for selectively clampingly holding the outer band against the jig means, the clamping means having an opening permitting access of the outer band slots.

2. The apparatus of claim 1 further characterized in that second jig means includes an arcuately elongated second jig having a radially inner arcuate surface and a radially outer arcuate surface, a plurality of arcuately spaced, transverse bores opening through the second jig, a jaw slidably mounted in each bore, a transversely elongated member for each jaw connected thereto and extending transversely outwardly of the respective bore in a direction transversely opposite the first jig means, each jaw having a vane leading edge portion receiving notch.

3. The apparatus of claim 2 further characterized in that the second jig includes a first and a second arcuately elongated flange extending axially toward the first jig means, said flanges being radially spaced with said bores opening radially therebetween, each flange having the same number of vane leading edge portion receiving notches, said flange notches being generally radially aligned with the jaw notches.

4. The apparatus of claim 2 further characterized in that the second adjustment means includes separate movable means for each jaw elongated member for selectively exerting a force thereagainst to move the respective jaw elongated member toward the first means and means mounted on the base member for mounting said separate means to retain the separate means in given transverse positions while permitting the separate means individually being selectively adjustably moved in transverse directions.

5. Apparatus for repairing or reconditioning a vane assembly having an arcuately elongated outer band, an arcuately elongated inner band, each band having a radially inner surface, a radially outer surface, and a corresponding number of arcuately curved vane receiving slots primarily extending in a direction transverse to the direction of elongation of the bands and opening through the inner band outer surface, and the outer band inner surface through to the outer band outer surface, each band having axially opposed edges transversely spaced from said slots, and a plurality of vanes each having an ear extendable in an inner band slot and an outer band slot and attachably to the adjacent band, said vanes in their attached condition to the bands having a trailing edge and a leading edge transversely opposite the trailing edge and offset from the trailing edge in a direction of elongation of the bands, said apparatus comprising a longitudinally elongated base member, a longitudinally elongated inner band support member having surface portions of a curvature for abuttingly engaging a substantial portion of the inner band inner surface, an arcuately curved vane leading edge first jig for abuttingly engaging the inner band outer surface and the outer band inner surface, an arcuately curved vane trailing edge second jig for abuttingly engaging the outer band inner surface, an axial edge of the inner band and the support member, said jigs being arcuately curved in a longitudinal direction and having transversely adjacent means for respectively abuttingly engaging the vane trailing and leading edge portions and holding the vanes against longitudinal displacement, third means on the base member for abuttingly engaging surfaces of the jigs transversely opposite the vane engaging means to selectively retain the jigs in tight abutting engagement with the vanes and holding the jigs against transverse displacement, means mounted on the base member for retaining the jigs in preselected relative longitudinal positions with the jig means of one jig longitudinally offset from the jig means of the other jig, and fourth means on the base member for abuttingly engaging the outer surface of the outer band to selectively retain the outer band in clamping engagement with the jigs, the last mentioned means having an opening providing access to the outer band slots.

6. The apparatus of claim 5 further characterized in that the second jig means comprises a jig portion having a plurality of arcuately spaced notches that are of the same size and shape and open toward the first jig, each notch having a transverse surface, a recessed planar surface intersecting said transverse surface and a surface inclined transversely and longitudinally toward the transverse surface and intersecting the recessed surface a substantial distance arcuately remote from the transverse surface, said jig portion having a first surface extending arcuately between arcuately adjacent notches whereby each vane as being retained by the jig means has a trailing edge portion abuttingly engaging the recessed surface and the transverse surface, and an arcuate portion more closely adjacent the leading edge than the trailing edge portion abuttingly engaging the jig portion at the intersection of the inclined surface and the respective first surface.

7. The apparatus of claim 6 further characterized in that the first jig means includes a first jig portion having arcuately spaced generally V-shaped notches of the same size and shape opening toward the second jig.

8. The apparatus of claim 5 further characterized in that the first jig means includes jaw means for each vane to abuttingly engage the respective vane leading edge portion, said second jig having an aperture extending therethrough for each jaw means for slidably mounting the jaw means, and that said third means includes adjustment means for each jaw means for holding each jaw means in a selected transverse position within a limited range and means mounted on the base member for mounting the adjustment means.

9. The apparatus of claim 8 further characterized in that each aperture has a shoulder and that each jaw means includes a jaw having a vane receiving notch, a rod attached to the jaw transversely opposite the notch and extending within the respective aperture and means bearing against the jaw opposite the jaw notch and the respective aperture shoulder for resiliently urging the jaw transversely toward the second jig.

10. The apparatus of claim 9 further characterized in that each jaw means includes a block attached to the respective jaw rod exteriorly of the jaw aperture for limiting the transverse movement of the jaw toward the second jig, and that the adjustment means includes a transversely adjustable bolt for each block for bearing against the respective block.

11. The apparatus of claim 5 further characterized in that the third means includes a plurality of transversely extending adjustment bolts and means for mounting said bolts for selective limited transverse movement bearing against a second jig surface transversely opposite the first jig.

12. The apparatus of claim 11 further characterized in that the adjustment bolt mounting means includes an elongated bar for mounting each adjustment bolt and means for each bar mounting the respective bar for pivotal movement about a transverse axis to permit moving the respective bar and the adjustment bolt mounted thereby between an elevation transversely opposite the second jig and an elevation between the second jig and the base member.

13. The apparatus of claim 12 further characterized in that each first jig means includes limited transversely movable jaw means for each vane for abuttingly engaging the respective vane leading edge portion and that the adjustment means includes means for each jaw means for adjustably retaining each jaw means in a selected maximum transverse spacing from the second jig when the second jig adjustment means is abuttingly engaging the second jig.

14. The apparatus of claim 5 further characterized in that the fourth means includes a pair of arcuately elongated outer band hold down bars each having longitudinally opposite end portions, longitudinally spaced means for retaining the hold down bars transversely spaced from one another, the last mentioned means and the hold down bars providing the fourth means opening, and fifth means mounted on the base member for selectively abuttingly engaging the outer band end portions to retain the hold down bars in clamping engagement with the outer band and thereby the outer band in tight engagement with the jigs.

15. The apparatus of claim 14 further characterized in that the fifth means includes a transverse bar having opposite end portions, an elongated mounting bar for each transverse bar end portion and attached thereto, movable eccentric means connected to the mounting bars remote from the transverse bar for mounting the mounting bars for generally pivotal movement and selectively mounting the mounting bars to draw the transverse bar into clamping engagement with the adjacent hold down bar end portions and means mounted on the base member adjacent the one end portion of the hold down bars for movably mounting the eccentric means.

16. The apparatus of claim 14 wherein the outer band has an arcuately elongated, radially outwardly extending angular flange and the inner band has an arcuately elongated, radially inwardly extending flange transversely intermediate its transversely opposite edges and transversely opposite the band slots from the vane trailing edges when the vanes are extended into said slots, and the inner band slots open through the inner band inner surface said apparatus being further characterized in that one of said hold down bands has an arcuately elongated groove for receiving said outer band flange, that the inner band support member has an arcuately elongated groove for receiving said inner band flange, and that said inner band support member and base member have cut outs opening through the surface against which the inner band abuts and through the base member to provide access to the inner band slots.

17. The apparatus of claim 16 further characterized in that there is provided means mounting the base member for pivotal movement about a horizontal axis and selectively retaining the base member in a selected one of a number of different pivotal positions.

18. The apparatus for repairing or reconditioning a vane assembly having an arcuately elongated outer band, an arcuately elongated inner band, each band being elongated in a longitudinal direction and having a radially inner surface and a radially outer surface, the outer band having a first axial end portion, an intermediate portion, an intermediate portion integrally joined to the aforementioned first portion and a second axial end portion integrally joined to the intermediate portion to form a radially inner shoulder and the inner band having a first axial end portion, an axially extending second portion integrally joined to the inner band first end portion and an arcuately elongated, inwardly radially extending flange integrally joined to the last mentioned first and second portions adjacent the juncture thereof, said intermediate portion and inner band second portion having a corresponding number of arcuately curved vane receiving slots primarily extending in a direction transverse to the direction of elongation of the bands and opening through the inner and outer bands, and a plurality of vanes having an ear extendable in an inner band slot and an outer band slot and attachably to the adjacent band, said vanes in their attached condition to the bands having a trailing edge and a leading edge transversely opposite the trailing edge and offset from the trailing edge in a direction of elongation of the bands, said apparatus comprising a longitudinally elongated base member, a longitudinally elongated inner band support member having surface portions of a curvature for abuttingly engaging a substantial portion of the inner band inner surface, said band support member having a first arcuately curved surface portion for abutting against the inner band first portion inner surface, a second arcuately curved surface portion for abuttingly engaging the inner band second portion inner surface and an arcuately elongated groove transversely between the aforementioned surface portions for receiving the above mentioned flange, an arcuately curved vane leading edge first jig for abuttingly engaging the adjacent surfaces of the band first portions for retaining them in a given radially spaced relationship, an arcuately curved vane trailing edge second jig for seating on the support member second surface portion, abuttingly engaging the outer band second portion and retaining the outer band second portion in a given radial spaced relationship to the band support member, said second jig having a grooved portion for receiving said outer band shoulder and an arcuately curved surface portion for abutting against the axial edge of the inner band that is axially remote from the inner band first portion, said jigs being arcuately curved in a longitudinal direction, the second jig having a plurality of arcuately spaced, radially extending vane trailing edge receiving notches, the first jig having a plurality of arcuately spaced, radially extending vane trailing edge receiving notches that are arcuately spaced the same as the first mentioned notches and longitudinally offset therefrom, a transversely extending bore for each notch opening in radial alignment with the notch, a jaw slidably mounted in each bore, each jaw having a vane leading edge notch and means extending within the bore for moving the jaw, means for mounting the jigs on the base member with the respective notches opening transversely toward the other jig and permitting transverse movement of the jigs, adjustment means abuttable against the second jig transversely opposite its notches for selectively transversely moving the second jig toward the first jig and holding the second jig against movement in a transverse direction away from the first jig, second adjustment means mounted on the base member for selectively individually moving each jaw mounting means in transverse direction toward the second jig and holding each jaw mounting means against movement in a transverse direction away from the second jig, first hold down means for bearing against the outer vane first end portion outer surface, second hold down means for bearing against the outer band second end portion outer surface and means mounted on the base member for selectively clampingly retaining the hold down means against the outer band outer surface portions, said first and second hold down means being transversely spaced to provide access to the outer band slots.

19. The apparatus of claim 18 further characterized in that each hold down means is longitudinally elongated and has generally horizontal first and second longitudinal extending end portion, that the clampingly retaining means includes third means for bearing against the first and second means first longitudinal end portions, fourth means for bearing against the first and second means second longitudinal end portions, and fifth means for mounting the third and fourth means for movement between a position bearing against the respective end portions to retain the hold down means in clamping engagement with the outer band and a position remote from the hold down means.

20. The apparatus of claim 19 further characterized in that there is provided a pair of guide pins for each hold down means that are secured to the base member to extend generally perpendicular relative thereto, each hold down means having a pair of guide pin apertures for receiving the respective guide pins whereby when the guide pins extend into the guide pin apertures, the hold down means may be only translated away from and toward the base member.

21. The apparatus of claim 18 further characterized in that each jig end portion has a transverse aperture, the aperture of the first jig being spaced the same distance as the apertures of the second jig, that the jig mounting means includes a pair of blocks secured to the base member about the same longitudinal spacing as the apertures of one of the jigs, and transversely extending means for each block extending transversely outwardly from opposite sides of the blocks to extend into the respective jig aperture to mount the jigs, said jigs being substantially only transversely movable relative to one another when the transversely extending means extends within the jig apertures.

22. The apparatus of claim 21 further characterized in that the band support member and base member have contiguous longitudinally elongated cut outs to permit access to the inner band slots when the inner band has its flange extended into the band support member groove, the band support member cut out opening to the last mentioned groove axially opposite the inner band first end portion.

23. The apparatus of claim 22 further characterized in that there is provided means for pivotally mounting the base member about a given pivotal axis and retaining the base member in any one of a number of selected angular positions about said pivotal axis.

References Cited

UNITED STATES PATENTS

| | | | |
|---|---|---|---|
| 1,644,883 | 10/1927 | Johnson | 29—200 |
| 2,095,964 | 10/1937 | Blickman | 29—200 |
| 2,176,664 | 10/1939 | Burke | 29—200 |
| 2,396,452 | 3/1946 | Widmark et al. | 29—200 |

THOMAS H. EAGER, *Primary Examiner.*

U.S. Cl. X.R.

269—37